(12) United States Patent
Kollar et al.

(10) Patent No.: US 11,617,125 B2
(45) Date of Patent: Mar. 28, 2023

(54) ACCESS CONTROL BARRING BASED ON CELL QUALITY

(71) Applicant: NOKIA TECHNOLOGIES OY, Espoo (FI)

(72) Inventors: Martin Kollar, Kosice (SI); Jing Ping, Chengdu (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 209 days.

(21) Appl. No.: 16/832,692

(22) Filed: Mar. 27, 2020

(65) Prior Publication Data
US 2020/0314730 A1  Oct. 1, 2020

(30) Foreign Application Priority Data

Mar. 28, 2019 (WO) ................ PCT/CN2019/080107

(51) Int. Cl.
*H04W 48/06* (2009.01)
*H04W 28/02* (2009.01)
*H04W 24/10* (2009.01)
*H04L 5/00* (2006.01)

(52) U.S. Cl.
CPC .......... *H04W 48/06* (2013.01); *H04L 5/0082* (2013.01); *H04W 24/10* (2013.01); *H04W 28/0268* (2013.01)

(58) Field of Classification Search
CPC . H04W 48/06; H04W 24/10; H04W 28/0268; H04L 5/0082
See application file for complete search history.

(56) References Cited

U.S. PATENT DOCUMENTS

| | | | |
|---|---|---|---|
| 2012/0099460 A1* | 4/2012 | Murakami | H04W 72/0453 370/252 |
| 2013/0301435 A1* | 11/2013 | Panah | H04W 52/0209 370/252 |
| 2017/0111886 A1 | 4/2017 | Kim et al. | |
| 2017/0238342 A1 | 8/2017 | Yang et al. | |

(Continued)

FOREIGN PATENT DOCUMENTS

| | | |
|---|---|---|
| WO | WO 2018/065065 A1 | 4/2018 |
| WO | WO 2019/013597 A1 | 1/2019 |
| WO | WO 2019/024276 A1 | 2/2019 |

OTHER PUBLICATIONS

3GPP TS 28.522 V15.0.0, $3^{rd}$ Generation Partnership Project; Technical Specification Group Services and System Aspects; Telecommunication management; Performance Management (PM) for mobile networks that include virtualized network functions; Stage 2 (Release 15) (Jun. 2018) 7 pages.

(Continued)

*Primary Examiner* — Walli Z Butt
*Assistant Examiner* — Thad N Defauw
(74) *Attorney, Agent, or Firm* — Alston & Bird LLP (57) ABSTRACT

A device, method, apparatus and computer readable storage medium are provided for access control barring (ACB) based on cell quality. In one example, a network device determines a set of metrics related to quality of service (QoS) performance for a plurality of services in a cell in a measurement period. The network device determines ACB configuration in the cell based on comparison of the set of metrics with a set of thresholds.

20 Claims, 4 Drawing Sheets

(56) References Cited

U.S. PATENT DOCUMENTS

| | | | |
|---|---|---|---|
| 2018/0032467 A1 | 1/2018 | Sheth et al. | |
| 2018/0324673 A1 | 11/2018 | Ozturk et al. | |
| 2019/0082376 A1 | 3/2019 | Hong et al. | |
| 2019/0246332 A1* | 8/2019 | Berggren | H04W 76/11 |
| 2020/0275344 A1 | 8/2020 | Byun et al. | |

OTHER PUBLICATIONS

3GPP TS 22.011 V15.1.0, 3rd Generation Partnership Project: Technical Specification Group Services and System Aspects; Service Accessibility (Release 15) (Jun. 2017) 32 pages.

3GPP TS 32.425 V16.1.0, 3rd Generation Partnership Project; Technical Specification Group Services and System Aspects; Telecommunication management; Performance Management (PM); Performance measurements Evolved Universal Terrestrial Radio Access Network (E-UTRAN) (Release 16) (Dec. 2018) 99 pages.

3GPP TS 36.413 V15.4.0, 3rd Generation Partnership Project; Technical Specification Group Radio Access Network; Evolved Universal Terrestrial Radio Access Network (E-UTRAN) S1 Application Protocol (S1AP) (Release 15) (Dec. 2018) 383 pages.

3GPP TS 32.450 V15.1.0, 3rd Generation Partnership Project; Technical Specification Group Services and System Aspects; Telecommunication management; Key Performance Indicators (KPI) for Evolved Universal Terrestrial Radio Access Network (E-UTRAN): Definitions (Release 15) (Dec. 2018) 17 pages.

3GPP TS 36.331 V14.9.0, 3rd Generation Partnership Project; Technical Specification Group Radio Access Network; Evolved Universal Terrestrial Radio Access (E-UTRA); Radio Resource Control (RRC); Protocol specification (Release 14) (Dec. 2018) 773 pages.

"3rd Generation Partnership Project; Technical Specification Group Services and System Aspects; Service accessibility (Release 16)", 3GPP TS 22.011 V16.4.0, (Dec. 21, 2018), 33 pages.

International Search Report and Written Opinion for Patent Cooperation Treaty Application No. PCT/CN2019/080107 dated Dec. 19, 2019, 6 pages.

Office Action for Indian Application No. 202147048913 dated Mar. 23, 2022, 8 pages.

"3rd Generation Partnership Project; Technical Specification Group Services and System Aspects; Service Requirements for the 5G System; Stage 1 (Release 15)", 3GPP TS 22.261 v15.7.0, (Dec. 2018), 51 pages.

Extended European Search Report for European Application No. 19921980.9 dated Oct. 20, 2022, 12 pages.

Qualcomm Incorporated, "Unified Access Control Based on 5QI", 3GPP TSG CT WG1 Meeting #112, C1-185160, (Aug. 20-24, 2018), 2 pages.

TCL, "QoS Flow Based Access Control for Connected Mode in NR", 3GPP TSG-RAN WG2 Meeting #102, R2-1806743, (May 21-25, 2018), 2 pages.

* cited by examiner

ACCESS CONTROL BARRING BASED ON CELL QUALITY

CROSS REFERENCE TO RELATED APPLICATIONS

This application claims priority to International PCT Application No. PCT/CN2019/080107, filed Mar. 28, 2019, the entire contents of which are incorporated herein by reference.

FIELD

Example embodiments of the present disclosure generally relate to the field of communications, and in particular, to a device, method, apparatus and computer readable storage medium for access control barring (ACB) based on cell quality.

BACKGROUND

In Evolved Universal Mobile Telecommunications System (UMTS) Terrestrial Radio Access Network (E-UTRAN), if user equipment (UE) requests a service either visible or not visible from the perspective of an end user, the UE typically has to initiate a random access procedure and then a Radio Resource Control (RRC) connection setup procedure, followed with a UE-associated logical S1 connection establishment procedure. In the case that the service is visible and initiated by the end user, a default E-UTRAN Radio Access Bearer (E-RAB) setup procedure is further triggered upon the establishment of the UE-associated logical S1 connection.

After these procedures are successful, the UE would be provided with the service. However, quality of the provided services may differ from cell to cell. The quality of the provided services means how good or bad the end user perceives the provided services, which depends on a lot of factors. For example, considering there is an overlapping between two cells and the UE may in principle camp in both of the two cells currently, there is no information communicated to the UE that would indicate which cell is better one in terms of Quality of Service (QoS) when the UE is in a RRC Idle state. Thus, if the UE entered a worse cell and got a requested service in the cell, worse quality even a service drop may be caused.

SUMMARY

In general, example embodiments of the present disclosure provide a device, method, apparatus and computer readable storage medium for access control barring (ACB) based on cell quality.

In a first aspect, a device is provided. The device comprises at least one processor and at least one memory including computer program code. The instructions, when executed by the at least one processor, cause the device to determine a set of metrics related to QoS performance for a plurality of services in a cell in a measurement period. The device is further caused to determine ACB configuration in the cell based on comparison of the set of metrics with a set of thresholds.

In a second aspect, a method is provided. In the method, a network device determines a set of metrics related to QoS performance for a plurality of services in a cell in a measurement period. The network device determines ACB configuration in the cell based on comparison of the set of metrics with a set of thresholds.

In a third aspect, there is provided an apparatus comprising means for performing the method according to the second aspect.

In a fourth aspect, there is provided a computer readable storage medium comprising program instructions stored thereon. The instructions, when executed by a processor of a device, cause the device to perform the method according to the second aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" or "user equipment" (UE) refers to any terminal device capable of wireless communications with each other or with the network device. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the network device on predetermined schedules, when triggered by an internal or external event, or in response to requests from the network side.

Examples of the UE include, but are not limited to, smart phones, wireless-enabled tablet computers, laptop-embedded equipment (LEE), laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

As used herein, the term "network device" refers to a network device via which services can be provided to a terminal device in a communication network. The network device may comprise any suitable device via which a terminal device or UE can access the communication network. Examples of the network devices include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

As used herein, the term "cell" refers to an area covered and served by a network device in which the network device can provide services. One network device may serve one or more cells. Difference cells may or may not use the same frequency resources such as sub-carriers.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

As described above, if the UE requests a service, the UE typically will not obtain data related to the requested service until several procedures are successful. Even if these procedures are successful, the quality of the provided service may be worse, or even the service may be dropped. For example, in the scenario that the UE camp in both of the two overlapping cells currently, there is no information that would indicate to the UE in the RRC Idle state which cell is better one in terms of QoS, or would restrict the UE for network access to the cell.

Nowadays, a cell can utilize a control process, which is called "Access Control", to control (or limit) the amount of access from UEs to prevent overload of an access channel under critical conditions. There are several different approaches for Access Control. One mechanism of these approaches is to accept an initial request from a UE but send a Reject message to the UE at a network side. This mechanism may be performed with a RRC Connection Reject message in a RRC layer or an Attach Reject message in a non-access stratum (NAS) layer.

Another mechanism for Access Control is to prevent a UE from attempt of the initial request. Two typical application cases of this mechanism are as follows: one case is to bar every UE from any type of access even for an emergency call, and the other case is to bar only a specific UE from a specific service, for example, with specific marking in UMTS Subscriber Identity Module (USIM). This mechanism may be performed with various system information block (SIB) settings. For example, the barring of all UEs from any type of access may be configured by SIB1, and the barring of the specific UE from the specific service may be configured by SIB2. Moreover, many implementations of this mechanism have evolved as cellular technology evolves.

The inventor finds that an overload situation of a cell may be separated from other conditions that may lead to insufficient QoS. For example, after a UE is allowed for network access, QoS for the UE may be degraded due to some reasons. This may cause a dropped session, a big delay of packet data convergence protocol (PDCP) service data units (SDUs), low scheduled International Protocol (IP) throughput, and the like. In a case, when the UE has a guaranteed bit rate (GBR) service ongoing, radio conditions may become bad in a cell. Thus, despite there is no radio link failure (RLF) detected for the UE, the UE may be abnormally released because QoS requirements for the UE such as throughput and delay cannot be achieved. In another case, the UE may have a non-GBR service ongoing. In this case, if a RLF has been detected, a UE may also be abnormally released.

In both the above cases, although an eNB try to provide requested QoS to the UEs in the cell, for example, the eNB may employ very robust techniques, such as the most robust modulation coding schemes (MCSs) and thus maximum possible resources, the maximum UE transmit power and other possible techniques such as handover (HO), redirection and the like, it may be not possible to keep the UEs active in the cell with the requested QoS simply because there is no needed capacity in the cell.

Each of the cases can be thus seen as an overload situation of a cell in which there is not enough capacity to keep the UE active in the cell with requested QoS. Currently, there is no consideration of associating a QoS issue with an overload issue, and thus there is no access control related to provided QoS.

Example embodiments of the present disclosure provide a novel access class barring (ACB) mechanism. This ACB mechanism configures ACB based on QoS performance in a cell. The QoS performance may be indicated by related metrics. The metrics may reflect any QoS characteristics such as throughput, latency and the like. For example, if QoS requirement of end users is evaluated, by using the metrics related to the QoS performance, to be unsatisfied even when relatively robust transmission schemes such as the most robust MCSs, the maximum possible resources, the maximum UE transmit power and the like have been utilized in a cell, UEs may be barred from access to the cell.

This ACB mechanism transforms a cell quality issue to an overload issue of the access channel. Accordingly, the ACB configuration may be based on the cell quality in a cell. For example, it may be configured when ACB will be activated and which ACB parameters will be used. This ACB mechanism may ensure the cell quality and thus may be more effective and efficient. Accordingly, system performance and efficiency may be improved.

Figure 1:
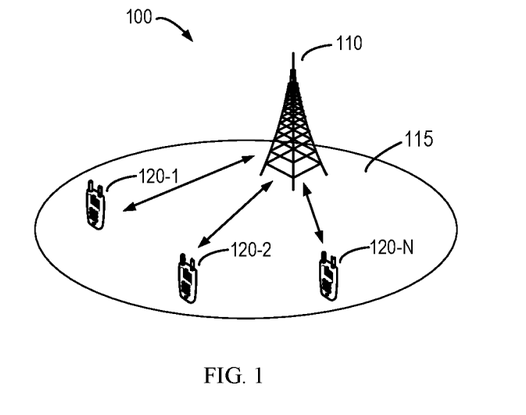
FIG. 1 illustrates an example scenario in which some example embodiments of the present disclosure can be implemented.

FIG. 1 shows an example environment 100 in which example embodiments of the present disclosure can be implemented. The environment 100, which may be a part of a communication network, comprises a network device 110 serving a cell 115. Three terminal devices 120-1, 120-2, . . . , 120-N (N represents a positive integer), collectively referred to as terminal devices 120, are located in the cell 115. Accordingly, the network device 110 can provide various services to the terminal devices 120 in the cell 115.

It is to be understood that one network device and three terminal devices are shown in the environment 100 only for the purpose of illustration, without suggesting any limitation to the scope of the present disclosure. Any suitable number of network devices may be deployed in the environment 100. One network device may serve one or more cells, and any suitable number of terminal devices may be located in one cell.

It is also to be understood that the environment 100 may comprise other network parts and network entities or functionalities (not shown). As an example, the environment 100 may include a network entity in a core network such as evolved packet core (EPC) or the fifth generation (5G) core.

The terminal device 120-1 can communicate with the network device 110 or with another terminal device 120-2 or 120-3 directly or indirectly via the network device 110. The communication may follow any suitable communication standards or protocols, which are already in existence or to be developed in the future, such as E-UTRAN, Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

In the environment 100, the network device 110 may activate ACB by broadcasting via SIB to bar terminal devices (for example, in a RRC Idle State) from access to the cell 115. The activation of ACB may be triggered due to no overload of an access channel under critical conditions as defined in the 3rd Generation Partnership Project (3GPP) specifications (for example, 3GPP TS 22.011). In some cases, there may be no overload of the access channel, but there is cell critical conditions due to lack of features and functionalities to keep the terminal devices 120 active in the cell 115 with guaranteed or requested QoS. In various example embodiments of the present disclosure, the cell overload under the cell critical conditions is mapped to the QoS performance issue. This cell overload may also trigger the activation of ACB in the cell 115 to restrict terminal devices for access to the cell 115.

Figure 2:
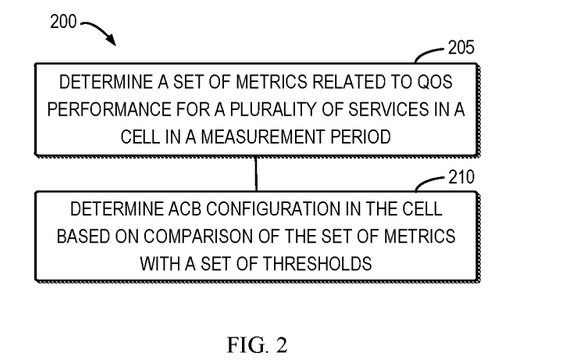
FIG. 2 illustrates a flowchart of an example method according to some example embodiments of the present disclosure.

FIG. 2 shows a flowchart of an example method 200 according to some example embodiments of the present disclosure. The method 200 can be implemented by the network device 110 as shown in FIG. 1. For the purpose of discussion, the method 200 will be described with reference to FIG. 1.

At block 205, the network device 110 determines a set of metrics related to QoS performance for a plurality of services in the cell 115 in a measurement period. In some example embodiments, the QoS performance may be overall QoS performance for all the services to obtain more general statistics for the cell 115. The more general statistics may represent QoS characteristics in the whole cell 115 by taking all active terminal devices 120 into account. In general, the critical conditions for both the access channel and cell overloads may be related to just limited number of terminal devices in a cell. The remaining terminal devices may be provided with needed QoS. The more general statistics may be more effective and efficient for a network optimization.

The metrics related to the QoS performance may reflect any QoS characteristics such as throughput and latency in the cell 115. In some example embodiments, the metrics may comprise values of Key Performance Indicators (KPIs) as defined in the 3GPP specifications (for example, 3GPP TS 32.450). It is possible that the metrics are related to other performance indication or indications that is already existed or to be developed in the future.

The measurement period for determining the metrics may be defined based on performance management (PM) counters as defined in the 3GPP specifications (for example, 3GPP TS 32.425). Alternatively, the measurement period may be set or configured by the network device 110 or another network entity or even a network operator according to operational requirements.

In some embodiments, the measurement period is split into a plurality of time intervals (in a unit of ms, for example). The determination of the metrics is implemented on a time interval basis. For example, at end of one of the time intervals, at least a subset of the metrics is determined to evaluate the QoS performance in the time interval. In some example embodiments, the metrics may be detected or monitored in the whole time interval. In some other example embodiments, the metrics may be monitored and averaged in a longer observation interval such as hours. At the end of a time interval included in the measure period, the snapshot of the metrics is taken by the network device 110, or taken and reported to the network device 110 by other devices such as the terminal device 120 or other network entities or functionalities. With this average in the longer observation interval, more general statistics on the QoS performance may be obtained.

The services may be of any suitable type depending on network deployment and end user's need, which may include voice, data, video and the like. These services may be in different QoS levels. Different QoS levels represents different QoS requirement. A QoS level may refer to a QoS Class Identifier (QCI) in E-UTRAN or QoS Flow Identifier (QFI) in 5G NR.

In some example embodiments, the determination of the QoS performance in the cell 115 may be performed per QoS level. In some embodiments, the set of metrics may comprise a plurality of subsets of metrics, and each subset of metrics is associated with one of the QoS levels. For example, KPIs per QCI in E-UTRAN may include E-RAB retainability per QCI, scheduled IP throughput per QCI and IP latency per QCI. In the embodiments where the metrics comprise values of KPIs and a QoS level is a QCI in E-UTRAN, E-RAB retainability per QCI, scheduled International Protocol (IP) throughput per QCI and IP latency per QCI may be detected or monitored as the metrics of the QoS performance in the cell 115.

In some example embodiments, the time intervals included in the measurement period may be associated with different QoS levels. In these embodiments, a subset of metrics may be determined at the end of the corresponding time interval based on the QoS level associated with both the metrics and time interval.

After the set of metrics is determined, at block 210, the network device 110 determines ACB configuration in the cell 115 based on comparison of the set of metrics with a set of thresholds. The thresholds may be set or configured at a network side. For example, the metrics may be compared with the associated thresholds at the end of the measurement period. If the metrics are configured per QoS level, the thresholds may also be set or configured per QoS level.

Based on the comparison of the metrics and the thresholds, the network device 110 may determine whether ACB is to be activated in the cell 115. For example, if it is determined that requested QoS is not achieved in the cell 115, the network device 110 may determine that ACB is to be activated. In some example embodiments, the achievement of the requested QoS may be determined based on the number of metrics that are degraded compared with the associated thresholds. In the case that the metrics are associated with different QoS levels, the achievement of the requested QoS may be determined further based on impacted QoS levels.

If the ACB is to be activated, the network device 110 may additionally determine or configure ACB parameters such as ac-BarringFactor and timers according to the 3GPP specifications (for example, 3GPP TS 36.331). The configuration of the ACB parameters may depend on in which area degradation has been observed in the cell 115, whether it is retainability, throughput or delay or all of them, and impacted services (or QCIs or QFIs). For example, more significant degradation in all of the areas and for majority of services is observed or detected, more aggressive parameters may be selected or configured.

Figure 3:
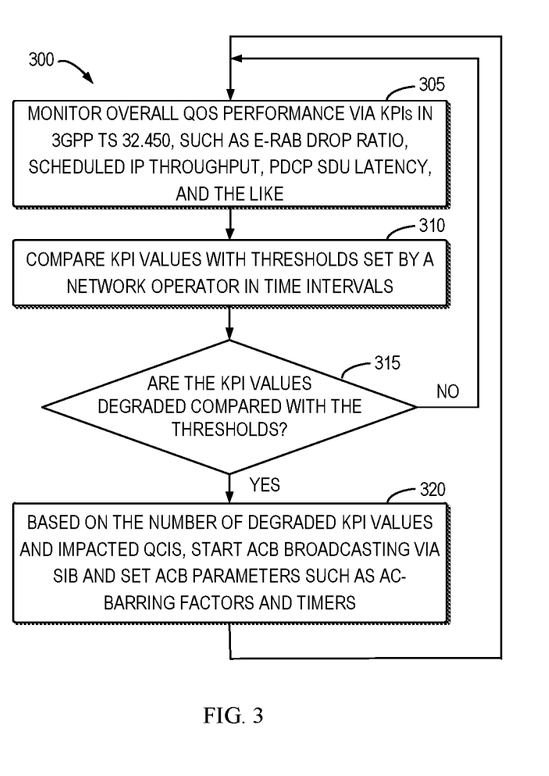
FIG. 3 illustrates a flowchart of an example process of ACB configuration based on QoS performance in a cell according to some example embodiments of the present disclosure.

FIG. 3 shows a flowchart of an example process 300 of ACB configuration based on QoS performance in a cell according to some example embodiments of the present disclosure.

The process 300 is an example implementation process of the method 200. In this example, the metrics comprise values of KPIs associated with different QoS levels that are indicated by QCIs in E-UTRAN. It is to be understood that some example embodiments are described in the context of E-UTRAN only for the purpose of illustration, without suggesting any limitation. Embodiments and implementations of the present disclosure are not limited to E-UTRAN, but applicable using any suitable technology including 5G, for example.

As shown, at block 305, the overall QoS performance is monitored for a measurement period in the cell 115 via KPIs such as E-RAB drop ratio, scheduled IP throughput, PDCP SDU latency and the like. In this example, the measurement period includes a plurality of time intervals. These KPIs are detected or monitored in the individual time intervals.

At block 310, the KPI values are compared with the associated thresholds in the time intervals. The thresholds are set by a network operator. At block 315, it is determined whether the KPI values are degraded compared to the thresholds. If no, the process 300 returns to block 305 and starts a new turn of QoS monitoring. If it is determined that there are degraded KPIs at block 305, the process 300 proceeds to block 320 where based on the number of degraded KPI values and the impacted QCIs, the network device 110 starts ACB broadcasting via SIB and sets ACB parameters such as AC-Barring factors and timers.

In some example embodiments, the achievement of the requested QoS may be determined per time interval. For example, in each of the time intervals within the measurement period, the metrics are determined and compared with the associated thresholds. Based on the comparison, the network device 110 determines whether the requested QoS is achieved in the individual time intervals. For example, if the metrics are degraded compared to the associated thresholds, it may be determined that the requested QoS is unachieved. In the embodiments where different time intervals are associated with different QoS levels, the degradation of the metrics may further be determined per QoS level.

The time intervals in which the requested QoS is unachieved are summed up. The summed-up time intervals are considered as a time period in which the requested QoS is unachieved in the measurement period. An example process of determining the time period will be discussed with reference to FIG. 4.

Figure 4:
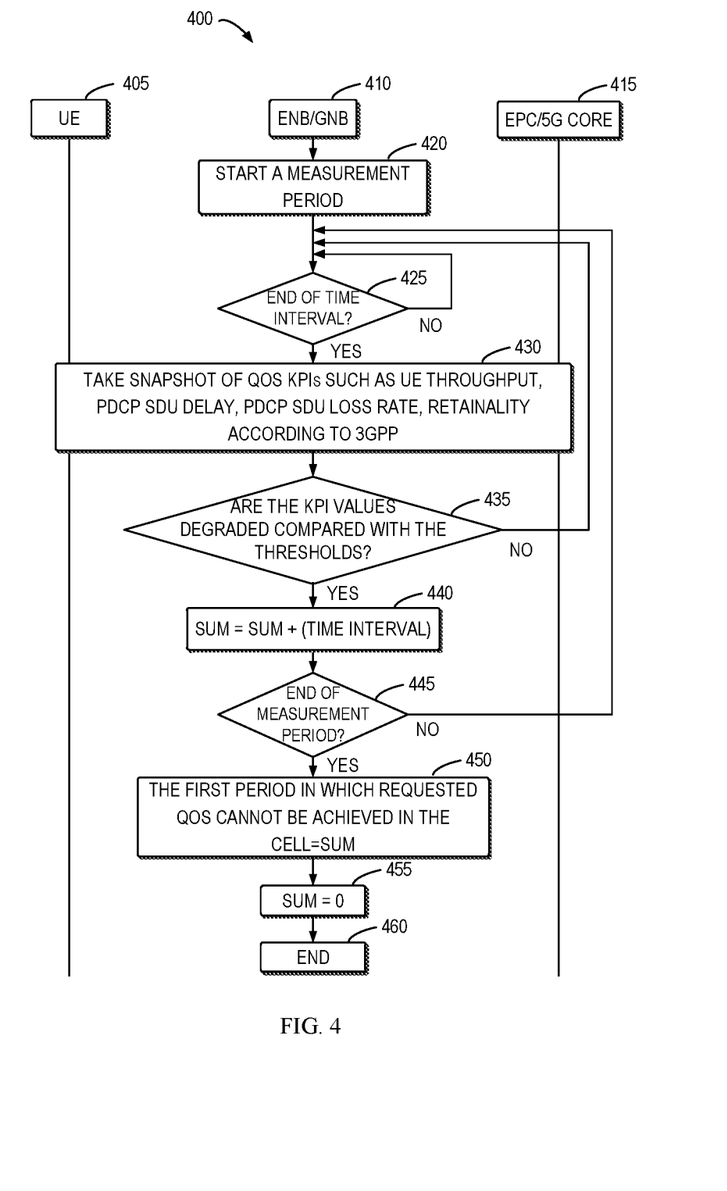
FIG. 4 illustrates an example message flow for determining a time period in which the requested QoS is unachieved in a cell according to some example embodiments of the present disclosure.

FIG. 4 shows an example message flow 400 for determining the time period according to some example embodiments of the present disclosure.

The message flow 400 may be implemented in the environment 100 as shown in FIG. 1. In this example, the terminal device 120 is implemented by a UE 405, and the network device 110 is implemented by an eNB or gNB 410. The environment 100 further includes an EPC or 5G Core 415.

As shown, the eNB or gNB 410 starts (420) a measurement period that includes a plurality of time intervals (or internal sampling intervals). The eNB or gNB 410 determines (425) whether a time interval is ended. If the time interval is not ended, the eNB or gNB 410 repeatedly determines (425) whether a next time interval is ended. If the time interval is ended, the snapshot of QoS KPIs is taken (430). The KPIs may include UE throughput, PDCP SDU delay, PDCP SDU loss rate, retainability and the like. The QoS KPIs may be provided as average from a longer observation interval such as hours. The snapshot is taken at the end of a time interval within the measurement period. The snapshot may be taken by any suitable devices such as the UE 405, the eNB or gNB 410 or the EPC or 5G Core 415.

The eNB or gNB 410 determines (435) whether a KPI is degraded compared to an associated threshold configured by the network operator, for example. The threshold may be configured per QCI or QFI if needed. If no KPI is degraded, the eNB or gNB 410 repeatedly determines (425) whether a next time interval is ended. If the KPI is degraded, the current time interval is counted (440) into the time period in which the requested QoS is unachieved. Then, the eNB or gNB 410 determines (445) whether the measurement period is ended. If the measurement period is not ended, the eNB or gNB 410 determines (415) again whether a next time interval within the measurement period is ended. If the measurement period is ended, the eNB or gNB 410 determines (450) that the requested QoS cannot be achieved in the cell 115 in the first period. The counter is reset (455), and the flow 400 ends (460).

Based on the time period, the ACB configuration may be determined in the cell 115. For example, based on a length of the time period, it may be determined whether ACB is to be activated in the cell in a time period subsequent to the measurement period. This time period may be a whole measurement period next to the current measurement period or just a part of the next measurement period. It may also be possible that the time period may comprise more than one subsequent measurement period. The length of the time period for activation of ACB in the cell may be determined according to actual needs.

The ACB mechanism according to example embodiments of the present disclosure is acting as a filter for barring some of UEs for network access to a given cell if the number of UEs that cannot be kept alive with guaranteed or requested QoS is being increased. For example, at the beginning when only a slight degrade of the QoS performance is monitored via KPIs (for example, in 3GPP TS 32.450), relatively non-aggressive ACB parameters as defined according to 3GPP TS 36.331 may be selected or configured. As the significant degradation is observed, the ACB parameters may be set to be more aggressive.

The ACB procedures in the cell 115 may follow any designs that is existed or to be developed in the future, for example as defined in the 3GPP specifications such as 3GPP TS 36.331. All the options for ACB as defined in the 3GPP specifications may be re-used herein.

In some example embodiments, the network device 110 may determine the ACB configuration based on overlapping of the cell 115 with one or more neighboring cells (not shown) and the QoS performance of the neighboring cells. The overlapping may be indicated by an overlapping factor related to an overlapping area between the cells. According to network deployment, the network device 110 may know how an area of the cell 115 is covered by the neighboring cells. If the neighboring cells are served by the network device 110, the network device 110 may detect or monitor the QoS performance in the cells. If the overlapping cells belong to different network devices, the QoS related information exchange between the overlapping cells can be implemented via an X2 interface between the network devices using a principle similar to overload information exchange.

If the requested QoS of the terminal devices 120 are not satisfied or achieved in the cell 115, other terminal devices, for example, in a RRC Idle state are barred from access to this cell 115. One or more ACB parameters such as ac-BarringFactors and timers as defined in 3GPP TS 36.331 may be set based on the overlapping factors and QoS performance of the neighboring cells. For example, if the neighboring cells cover majority of the area of the cell 115 and have excellent QoS, more aggressive ACB parameters may be used in the cell 115 because the bared terminal devices 120 will be handled by the neighboring cells with excellent QoS.

In some example embodiments, the following use case may be added into 3GPP TS 32.425:

---

A.5 Monitor of cell level QoS and radio resource utilisation

---

In an E-UTRAN cell the quality of service achieved is directly influenced by a number of factors, including:
Loading of users on the cell
Traffic loading and characteristics
UE locations and mobility
RRM policies
Scheduling
congestion control
admission control
layer 2 protocol configuration
Mapping of traffic to QCI
Setting of QoS parameters other than the QCI.
It is very important to be able to monitor the QoS to determine whether the combined effect of these policies, algorithms and external factors is satisfactory. Unsatisfactory QoS may be rectified by adjusting policies and RRM settings for instance. In case the rectification is not leading to desired QoS, some other policies (ACB, rejected RRC connection setup) based on restricting the UEs for network access to the cell may be applied.
Time period the requested quality of service cannot be achieved
An overload situation in the cell does not need to be related to other conditions leading to insufficient QoS. That means UE is allowed for network access but later one due to some other reason either the session is dropped, or there is big PDCP SDU delay or low IP scheduled throughput, etc. Let's consider a UE which is having a GBR service ongoing. The radio conditions in the cell are bad and thus despite there is no RLF detected for the UE, because the QoS characteristics for the UE like throughput and delay cannot be achieved, the UE is abnormally released. Another example could be for the UE having a nonGBR service ongoing and RLF has been detected, which leads to abnormal UE release as well. In both cases despite the cell serving the UEs did its best from the point of view the most robust MCSs and thus maximum possible resources used, maximum UE transmit power and using other possible techniques (like HO, redirection . . .), it was not possible to keep the UEs active in the cell with guaranteed QoS simply because the cell did not have the needed capacity (features) to do so.
For operator it is therefore very important to monitor duration the requested quality of service cannot be achieved.

---

It is possible that the metrics or measurements are monitored or used by a network operator outside of the network device 110 such as an eNB, a gNB or a cell for optimization, for example. The related use case may be specified or defined in the 3GPP specifications.

In some example embodiments, the following new measurement may be added into the 3GPP TS 32.425:

---

4.4.8 Time Period the Requested Quality of Service Cannot be Achieved in the Cell

--- a) This measurement provides time period the requested QoS cannot be achieved in the cell. The measurement is split into subcounters per QoS class level (QCI). Concerning operator specific QCIs, their definition is vendor specific.
b) CC
c) This measurement is obtained by summing up the pre-defined sampling intervals during which the requested QoS cannot be achieved in the cell and reporting accumulated value at the end of measurement period. Which QoS parameters for the related QCI shall be considered and the number of QCI E-RABs for which the requested QoS cannot be achieved to consider the sampling interval with the requested QoS cannot be achieved is vendor specific.
d) Each measurement is an integer value (Unit: ms).
e) The measurement name has the form Cell.ReqQoSNotAchieved.QCI where QCI identifies the E-RAB level quality of service -continued

| 4.4.8 Time Period the Requested Quality of Service Cannot be Achieved in the Cell |
|---|
| class. |
| f) EUtranCellFDD<br>EUtranCellTDD |
| g) Valid for packet switched traffic. |
| h) EPS. |
| i) In case the duration interval provided with this measurement is followed with the on restricting the UEs for network access to the cell policy executed via ACB as mentioned in A.5 then this measurement provides "Time period in Active ACB triggered via requested QoS cannot be achieved". |

In some example embodiments, new measurement in 3GPP TS 28.522 may be defined as follows:

| Time Period the Requested Quality of Service Cannot be Achieved in the Cell |
|---|
| a) This measurement provides time period the requested QoS cannot be achieved in the cell. The measurement is split into subcounters per QoS flow identifier (QFI). Concerning operator specific QFIs their definition is vendor specific. |
| b) CC |
| c) This measurement is obtained by summing up the pre-defined sampling intervals during which the requested QoS cannot be achieved in the cell and reporting accumulated value at the end of measurement period. Which QoS parameters for the related QFI shall be considered and the number of QFI Flows for which the requested QoS cannot be achieved to consider the sampling interval with the requested QoS cannot be achieved is vendor specific. |
| d) Each measurement is an integer value (Unit: ms). |
| e) The measurement name has the form Cell.ReqQoSNotAchieved.QFI where QFI identifies the QoS Flow Identifier. |
| f) Cell |
| g) Valid for packet switched traffic. |
| h) 5GS |

Figure 5:
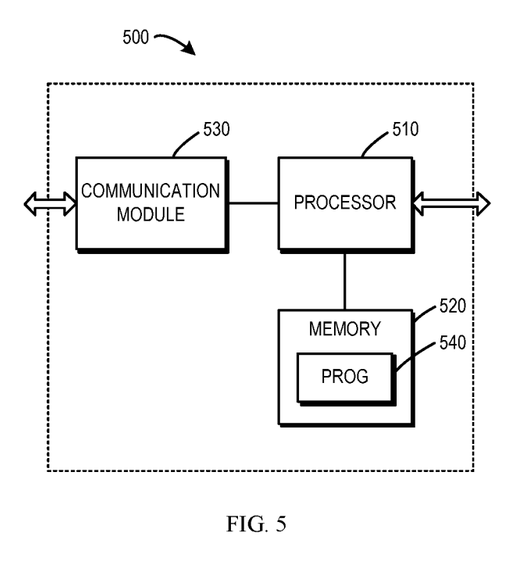
FIG. 5 illustrates a simplified block diagram of a device that is suitable for implementing example embodiments of the present disclosure.

FIG. 5 is a simplified block diagram of a device 500 that is suitable for implementing example embodiments of the present disclosure. The device 500 can be implemented at or as a part of the network device 110 as shown in FIG. 1.

As shown, the device 500 includes a processor 510, a memory 520 coupled to the processor 510, a communication module 530 coupled to the processor 510, and a communication interface (not shown) coupled to the communication module 530. The memory 520 stores at least a program 540. The communication module 530 is for bidirectional communications, for example, via multiple antennas. The communication interface may represent any interface that is necessary for communication.

The program 540 is assumed to include program instructions that, when executed by the associated processor 510, enable the device 500 to operate in accordance with the example embodiments of the present disclosure, as discussed herein with reference to FIGS. 2-4. The example embodiments herein may be implemented by computer software executable by the processor 510 of the device 500, or by hardware, or by a combination of software and hardware. The processor 510 may be configured to implement various example embodiments of the present disclosure, for example, any of the method 200, the process 300 and the flow 400.

The memory 520 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 520 is shown in the device 500, there may be several physically distinct memory modules in the device 500. The processor 510 may be of any type suitable to the local technical network, and may include one or more of general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

When the device 500 acts as the network device 110 or a part of the network device 110, the processor 510 and the communication module 530 may cooperate to implement the method 200, the process 300 and the flow 400 as described above with reference to FIGS. 2-4.

All operations and features as described above with reference to FIGS. 2-4 are likewise applicable to the device 500 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200, the process 300 and the flow 400 as described above with reference to FIGS. 2-4. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, a computer readable medium and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a device comprises: at least one processor; and at least one memory including computer program code; the at least one memory and the computer program code configured to, with the at least one processor, cause the device to: determine a set of metrics related to quality of service (QoS) performance for a plurality of services in a cell in a measurement period; and determine access control barring (ACB) configuration in the cell based on comparison of the set of metrics with a set of thresholds.

In some example embodiments, the measurement period comprises a plurality of time intervals, and the device is caused to determine the set of metrics by: determining at least a subset of metrics in the set of metrics at the end of a time interval of the plurality of time intervals; and comparing at least the subset of metrics with thresholds associated with at least the subset of metrics in the set of thresholds.

In some example embodiments, the device is caused to determine the ACB configuration by: determining, based on the comparison of the at least one subset of metrics and the associated thresholds, whether requested QoS is achieved in the cell in the time interval; in response to determining that the requested QoS is unachieved, counting the time interval into a time period in which the requested QoS is unachieved in the cell; and determining the ACB configuration based on the time period.

In some example embodiments, the time interval is associated with a QoS level of a plurality of QoS levels for the plurality of services, the subset of metrics is associated with the QoS level, and the device is caused to determine the at least the subset of metrics by: determining the subset of metrics at the end of the time interval.

In some example embodiments, the device is caused to determine the ACB configuration by: determining that ACB is to be activated in the cell based on the comparison of the set of metrics with the set of thresholds.

In some example embodiments, the device is caused to determine that the ACB is to be activated by: determining, in the set of metrics, a number of metrics that are degraded compared with thresholds associated with the number of metrics in the set of thresholds; determining, at least in part based on the number of metrics, whether requested QoS is achieved in the cell in the measurement period; and in response to determining that the requested QoS is unachieved, determining that the ACB is to be activated in the cell.

In some example embodiments, the number of metrics are associated with a set of QoS levels for the plurality of services, and the device is caused to determine whether the requested QoS is achieved by: determining, further based on the set of QoS levels, whether the requested QoS is achieved in the measurement period in the cell.

In some example embodiments, the device is further caused to determine the ACB configuration by: determining overlapping of the cell with a neighboring cell and QoS performance of the neighboring cell; and determining a parameter for the ACB based on the overlapping of the cell with the neighboring cell and the QoS performance of the neighboring cell.

In some aspects, a method comprises: determining, by a network device, a set of metrics related to quality of service (QoS) performance for a plurality of services in a cell in a measurement period; and determining access control barring (ACB) configuration in the cell based on comparison of the set of metrics with a set of thresholds.

In some example embodiments, the measurement period comprises a plurality of time intervals, and determining the set of metrics comprises: determining at least a subset of metrics in the set of metrics at the end of a time interval of the plurality of time intervals; and comparing at least the subset of metrics with thresholds associated with at least the subset of metrics in the set of thresholds.

In some example embodiments, determining the ACB configuration comprises: determining, based on the comparison of the at least one subset of metrics and the associated thresholds, whether requested QoS is achieved in the cell in the time interval; in response to determining that the requested QoS is unachieved, counting the time interval into a time period in which the requested QoS is unachieved in the cell; and determining the ACB configuration based on the time period.

In some example embodiments, determining the ACB configuration based on the time period comprises: determining, based on a length of the time period, that ACB is to be activated in the cell in a time period subsequent to the measurement period.

In some example embodiments, the time interval is associated with a QoS level of a plurality of QoS levels for the plurality of services, the subset of metrics is associated with the QoS level, and determining the at least the subset of metrics comprises: determining the subset of metrics at the end of the time interval.

In some example embodiments, determining the ACB configuration comprises: determining that ACB is to be activated in the cell based on the comparison of the set of metrics with the set of thresholds.

In some example embodiments, determining that the ACB is to be activated comprises: determining, in the set of metrics, a number of metrics that are degraded compared with thresholds associated with the number of metrics in the set of thresholds; determining, at least in part based on the number of metrics, whether requested QoS is achieved in the cell in the measurement period; and in response to determining that the requested QoS is unachieved, determining that the ACB is to be activated in the cell.

In some example embodiments, the number of metrics are associated with a set of QoS levels for the plurality of services, and determining whether the requested QoS is achieved comprises: determining, further based on the set of QoS levels, whether the requested QoS is achieved in the measurement period in the cell.

In some example embodiments, determining the ACB configuration further comprises: determining overlapping of the cell with a neighboring cell and QoS performance of the neighboring cell; and determining a parameter for the ACB based on the overlapping of the cell with the neighboring cell and the QoS performance of the neighboring cell.

In some aspects, an apparatus comprises: means for determining, by a network device, a set of metrics related to quality of service (QoS) performance for a plurality of services in a cell in a measurement period; and means for determining access control barring (ACB) configuration in the cell based on comparison of the set of metrics with a set of thresholds.

In some example embodiments, the measurement period comprises a plurality of time intervals, and the means for determining the set of metrics comprises: means for determining at least a subset of metrics in the set of metrics at the end of a time interval of the plurality of time intervals; and means for comparing at least the subset of metrics with thresholds associated with at least the subset of metrics in the set of thresholds.

In some example embodiments, the means for determining the ACB configuration comprises: means for determining, based on the comparison of the at least one subset of metrics and the associated thresholds, whether requested QoS is achieved in the cell in the time interval; means for in response to determining that the requested QoS is unachieved, counting the time interval into a time period in which the requested QoS is unachieved in the cell; and means for determining the ACB configuration based on the time period.

In some example embodiments, the means for determining the ACB configuration based on the time period comprises: means for determining, based on a length of the time period, that ACB is to be activated in the cell in a time period subsequent to the measurement period.

In some example embodiments, the time interval is associated with a QoS level of a plurality of QoS levels for the plurality of services, the subset of metrics is associated with the QoS level, and the means for determining the at least the subset of metrics comprises: means for determining the subset of metrics at the end of the time interval.

In some example embodiments, the means for determining the ACB configuration comprises: means for determining that ACB is to be activated in the cell based on the comparison of the set of metrics with the set of thresholds.

In some example embodiments, the means for determining that the ACB is to be activated comprises: means for determining, in the set of metrics, a number of metrics that are degraded compared with thresholds associated with the number of metrics in the set of thresholds; means for determining, at least in part based on the number of metrics, whether requested QoS is achieved in the cell in the measurement period; and means for in response to determining that the requested QoS is unachieved, determining that the ACB is to be activated in the cell.

In some example embodiments, the number of metrics are associated with a set of QoS levels for the plurality of services, and the means for determining whether the requested QoS is achieved comprises: means for determining, further based on the set of QoS levels, whether the requested QoS is achieved in the measurement period in the cell.

In some example embodiments, the means for determining the ACB configuration further comprises: means for determining overlapping of the cell with a neighboring cell and QoS performance of the neighboring cell; and means for determining a parameter for the ACB based on the overlapping of the cell with the neighboring cell and the QoS performance of the neighboring cell.

In some aspects, a computer readable storage medium comprises program instructions stored thereon, the instructions, when executed by a processor of a device, causing the device to perform the method as described above.

What is claimed is:

1. A device comprises:
   at least one processor; and
   at least one memory including computer program code;
   the at least one memory and the computer program code configured to, with the at least one processor, cause the device to:
   determine a set of metrics related to quality of service (QoS) performance for a plurality of services in a cell in a plurality of time intervals of a measurement period;
   determine access control barring (ACB) configuration in the cell based on a sum of the time intervals of the measurement period in which the QoS is unachieved as defined by a comparison of the set of metrics with a set of thresholds; and
   based on a determination of the ACB configuration, cause ACB to be activated.

2. The device of claim 1, wherein the device is caused to determine the set of metrics by:
   determining at least a subset of metrics in the set of metrics at the end of a time interval of the plurality of time intervals; and
   comparing at least the subset of metrics with thresholds associated with at least the subset of metrics in the set of thresholds.

3. The device of claim 1, wherein the device is caused to determine the ACB configuration by:
   determining that ACB is to be activated in the cell based on the comparison of the set of metrics with the set of thresholds.

4. The device of claim 2, wherein the device is caused to determine the ACB configuration by:

determining, based on the comparison of the at least one subset of metrics and the associated thresholds, whether requested QoS is achieved in the cell in the time interval;

in response to determining that the requested QoS is unachieved, counting the time interval into a time period in which the requested QoS is unachieved in the cell; and determining the ACB configuration based on the time period.

5. The device of claim 2, wherein the time interval is associated with a QoS level of a plurality of QoS levels for the plurality of services, the subset of metrics is associated with the QoS level, and the device is caused to determine the at least the subset of metrics by:

determining the subset of metrics at the end of the time interval.

6. The device of claim 3, wherein the device is caused to determine that the ACB is to be activated by:

determining, in the set of metrics, a number of metrics that are degraded compared with thresholds associated with the number of metrics in the set of thresholds;

determining, at least in part based on the number of metrics, whether requested QoS is achieved in the cell in the measurement period; and in response to determining that the requested QoS is unachieved, determining that the ACB is to be activated in the cell.

7. The device of claim 3, wherein the device is further caused to determine the ACB configuration by:

determining overlapping of the cell with a neighboring cell and QoS performance of the neighboring cell; and determining a parameter for the ACB based on the overlapping of the cell with the neighboring cell and the QoS performance of the neighboring cell.

8. The device of claim 4, wherein the device is caused to determine the ACB configuration based on the time period by:

determining, based on a length of the time period, that ACB is to be activated in the cell in a time period subsequent to the measurement period.

9. The device of claim 6, wherein the number of metrics are associated with a set of QoS levels for the plurality of services, and the device is caused to determine whether the requested QoS is achieved by:

determining, further based on the set of QoS levels, whether the requested QoS is achieved in the measurement period in the cell.

10. A method comprising:

determining, by a network device, a set of metrics related to quality of service (QoS) performance for a plurality of services in a cell in a plurality of time intervals of a measurement period;

determining access control barring (ACB) configuration in the cell based on a sum of the time intervals of the measurement period in which the QoS is unachieved as defined by a comparison of the set of metrics with a set of thresholds; and based on a determination of the ACB configuration, causing ACB to be activated.

11. The method of claim 10, wherein determining the set of metrics comprises:

determining at least a subset of metrics in the set of metrics at the end of a time interval of the plurality of time intervals; and comparing at least the subset of metrics with thresholds associated with at least the subset of metrics in the set of thresholds.

12. The method of claim 10, wherein determining the ACB configuration comprises:

determining that ACB is to be activated in the cell based on the comparison of the set of metrics with the set of thresholds.

13. The method of claim 11, wherein determining the ACB configuration comprises:

determining, based on the comparison of the at least one subset of metrics and the associated thresholds, whether requested QoS is achieved in the cell in the time interval;

in response to determining that the requested QoS is unachieved, counting the time interval into a time period in which the requested QoS is unachieved in the cell; and determining the ACB configuration based on the time period.

14. The method of claim 11, wherein the time interval is associated with a QoS level of a plurality of QoS levels for the plurality of services, the subset of metrics is associated with the QoS level, and determining the at least the subset of metrics comprises:

determining the subset of metrics at the end of the time interval.

15. The method of claim 12, wherein determining that the ACB is to be activated comprises:

determining, in the set of metrics, a number of metrics that are degraded compared with thresholds associated with the number of metrics in the set of thresholds;

determining, at least in part based on the number of metrics, whether requested QoS is achieved in the cell in the measurement period; and in response to determining that the requested QoS is unachieved, determining that the ACB is to be activated in the cell.

16. The method of claim 12, wherein determining the ACB configuration further comprises:

determining overlapping of the cell with a neighboring cell and QoS performance of the neighboring cell; and determining a parameter for the ACB based on the overlapping of the cell with the neighboring cell and the QoS performance of the neighboring cell.

17. The method of claim 13, wherein determining the ACB configuration based on the time period comprises:

determining, based on a length of the time period, that ACB is to be activated in the cell in a time period subsequent to the measurement period.

18. The method of claim 15, wherein the number of metrics are associated with a set of QoS levels for the plurality of services, and determining whether the requested QoS is achieved comprises:

determining, further based on the set of QoS levels, whether the requested QoS is achieved in the measurement period in the cell.

19. A non-transitory computer readable storage medium comprising program instructions stored thereon, the instructions, when executed, being configured to:

determine a set of metrics related to quality of service (QoS) performance for a plurality of services in a cell in a plurality of time intervals of a measurement period;

determine access control barring (ACB) configuration in the cell based on a sum of the time intervals of the measurement period in which the QoS is unachieved as defined by a comparison of the set of metrics with a set of thresholds; and based on a determination of the ACB configuration, cause ACB to be activated.

20. The non-transitory computer readable storage medium of claim 19, wherein the instructions configured to determine the set of metrics comprise instructions configured to:

determine at least a subset of metrics in the set of metrics at the end of a time interval of the plurality of time intervals; and compare at least the subset of metrics with thresholds associated with at least the subset of metrics in the set of thresholds.

* * * * *

UNITED STATES PATENT AND TRADEMARK OFFICE
CERTIFICATE OF CORRECTION

| | |
|---|---|
| PATENT NO. | : 11,617,125 B2 |
| APPLICATION NO. | : 16/832692 |
| DATED | : March 28, 2023 |
| INVENTOR(S) | : Kollar et al. |

It is certified that error appears in the above-identified patent and that said Letters Patent is hereby corrected as shown below:

On the Title Page

Item (30) Foreign Application Priority Data should read:
--Mar. 28, 2019 (CN) ..........PCT/CN2019/080107--.

Signed and Sealed this
Ninth Day of April, 2024

Katherine Kelly Vidal
*Director of the United States Patent and Trademark Office*